(No Model.)
E. B. FOOTE, Jr.
WONDER CAMERA.
No. 273,500. Patented Mar. 6, 1883.
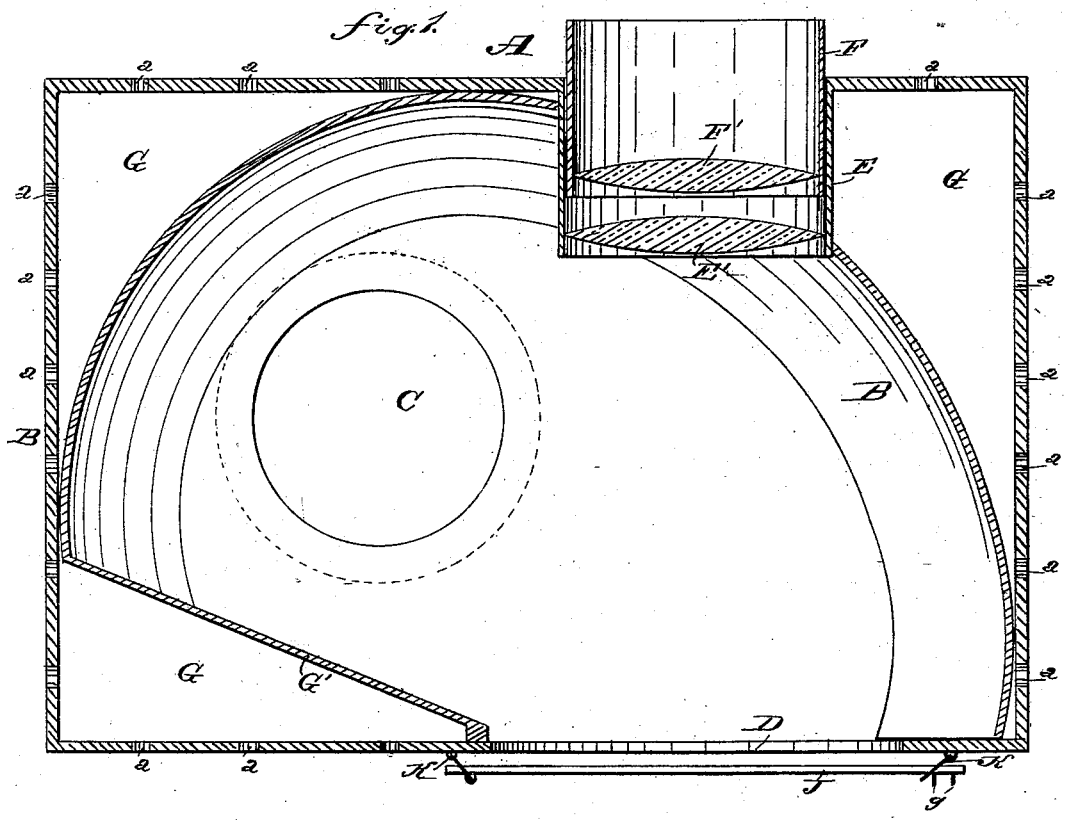
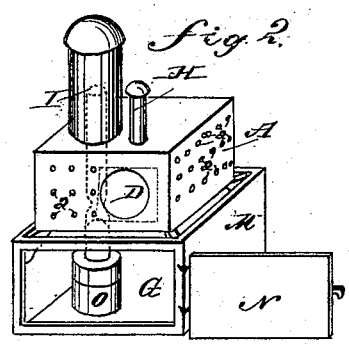
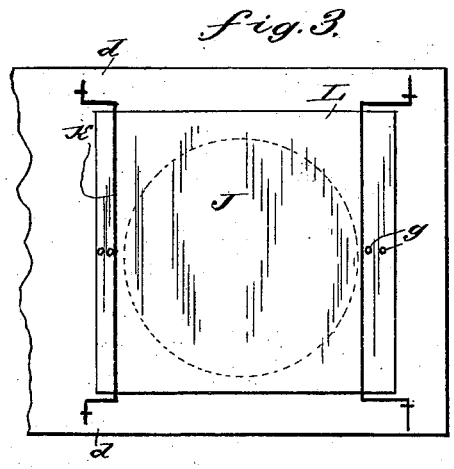
WITNESSES:
INVENTOR:
E. B. Foote Jr.
BY
ATTORNEYS.

UNITED STATES PATENT OFFICE.

EDWARD B. FOOTE, JR., OF NEW YORK, N. Y.

WONDER-CAMERA.

SPECIFICATION forming part of Letters Patent No. 273,500, dated March 6, 1883.

Application filed June 27, 1882. (No model.)

*To all whom it may concern:*

Be it known that I, EDWARD B. FOOTE, Jr., of the city, county, and State of New York, have invented a new and Improved Magic Lantern, of which the following is a full, clear, and exact description.

This invention relates to certain new and useful improvements in magic lanterns, especially in that class known as "wonder-cameras," "megascopes," or "polyopticons."

This invention is an improvement on the magic lantern for which United States Letters Patent No. 242,767 were issued to me on the 14th day of June, 1881; and it consists in a megascope or wonder-camera constructed with an ellipsoidal or elliptical mirror having an aperture for the lens-tube opposite the picture-opening, whereby light can be reflected on the picture from all parts of the mirror, and very clear pictures will be obtained. Air-chambers are formed between the sides of the box and the mirror, and the sides of the box are perforated to produce a circulation of air and to cool the mirror and other parts of the apparatus.

The invention also consists in a box for receiving the mirror-box, which is also adapted to form a support for the mirror-box when the camera is in use.

Reference is to be had to the accompanying drawings, forming part of this specification, in which similar letters of reference indicate corresponding parts in all the figures.

Figure 1 is a sectional plan view of my improved magic lantern or wonder-camera. Fig. 2 is a perspective view of the same, showing it raised for operation. Fig. 3 is an elevation of the picture-door.

A box, A, contains a semi-ellipsoidal mirror, B, made of metal or glass, as may be desired, which mirror is so located in the box A that the center of the light of a lamp will be the focus of one of the curves of this ellipsoidal mirror. The center of a picture-opening, D, in the back of the box A will be approximately in the focus of the other or opposite curve of this ellipsoidal mirror; or, in other words, the center of the light is in one focus and the center of the picture in the other focus of this ellipsoidal mirror. The tube E, in the inner end of which a lens, E', is secured, projects into the mirror B and from the front of the box A, and contains a sliding tube, F, provided with a lens, F', and by adjusting the position of these lenses the size of the picture shown on the screen may be varied as desired. Compartments G G are formed between the sides, front, and back of the box A and the outer surface of the mirror B, and a diagonal partition, G', at the rear of the box. The box A can be made of wood, pasteboard, or metal, the former materials being preferred, as they will not heat as rapidly as metal will.

In order to cool the air in the spaces or compartments G, I have provided the side, back, and front of the box A with numerous apertures a, through which the air can circulate and pass in and out of the compartments G. A ventilating-chimney, H, provided with a suitable hood, projects from the top of the box A, and carries off the hot air or gases that may collect in the box A. The apertures in the top and bottom of the box A are of such size that the lamp-chimney can freely pass through them, and sufficient space will be left between the chimney and the edges of these apertures so that the air can circulate between the edges of the openings C and the lamp-chimney, which projects into a metal chimney, I, on the top of the box A, which chimney I is surmounted by a suitable hood.

The picture-opening D of the box A is closed by a door, J, which is hinged at one end to a wire, K, provided at the top and bottom with crank-arms d, the ends of which are pivoted to the outer surface of the back of the box A. The free end of the door J passes under a like wire, L, the ends of which are also provided with crank-arms, which are pivoted to the outer surface of the back of the box A. The door is provided at its outer surface with studs g, on which the wire L can catch to keep the door closed. The door can be swung on the wire K in the usual manner, and when both ends are held by the wires the door can be moved a sufficient distance from the back of the box A to pass a picture between this door and the box, so that the picture will cover the opening D.

When the chimneys I and H and the lamp-chimneys are removed from the box A this box can be placed into a larger box, M, provided with a hinged or sliding door, N. When the camera is to be used the box A is placed upon the box M, the lamp O is placed in the box M, and the lamp-chimney passes through an aperture in the top of the box M and through the aperture C in the box A. The box M shades the room and prevents the dispersion of light, except backward, where a little light will be wanted by the operator to adjust the pictures and regulate them and to regulate the burner.

The lamp is of the usual construction, preferably provided with an Argand burner, and of such size that it can be passed within the chimney I.

When not in use all the parts of this camera can be snugly packed within the box A. The pictures can be passed between the door J and the back of the box A, either laterally or vertically, as may be desired.

The mirror B need not necessarily have the form of half or part of an ellipsoid, but can have the form of half of an elliptical cylinder.

As stated above, one focus is in the middle of the light and the other approximately in the middle of the picture-opening D, and the center line of the lens-tube E is directly opposite the middle of the picture-opening, so that the light which is in one focus of the mirror will be reflected from all parts of the mirror upon the picture. It will be observed that light is not only thrown upon the picture by that part of the mirror behind the light, but light will also be reflected from that part of the mirror on the right side of the box, between the right side of the picture-opening and the inner end of the lens-tube E. The pictures produced will be much clearer and more distinct than those produced by the usual wonder-cameras.

The box A is preferably so constructed that a lens of from four to five inches focus can be used, and thus a large and luminous picture can be produced on a screen, and the apparatus need be only a comparatively short distance from this screen. If the picture-opening is about three inches in diameter, it is possible to produce a picture four feet in diameter on a screen five feet from the apparatus.

Instead of providing a door, N, in the end or side of the box, a door can be provided in the top or bottom of the box.

Having thus fully described my invention, I claim as new and desire to secure by Letters Patent—

1. A megascope or wonder-camera constructed with a mirror in the shape of a semi-ellipsoid or a semi-elliptical cylinder, which mirror is provided with an aperture for receiving the lens-tube, substantially as herein shown and described, and for the purpose set forth.

2. In a megascope or wonder-camera, the combination, with a box having a picture-opening in the rear, of an elliptical or semi-ellipsoidal mirror contained in the said box, and provided with an opening for receiving the lens-tube, substantially as herein shown and described, and for the purpose set forth.

3. In a megascope or wonder-camera, the box A, provided with apertures $a$ and openings for the lamp-chimney, combined with the mirror B, forming compartments G between the sides of the mirror and the box, substantially as herein shown and described, and for the purpose set forth.

4. In a megascope or wonder-camera, the combination, with the box A, provided with apertures $a$, of the mirror B and the diagonal partition G', substantially as herein shown and described, whereby air-chambers for cooling the apparatus are provided, as set forth.

EDWARD B. FOOTE, Jr.

Witnesses:
OSCAR F. GUNZ,
C. SEDGWICK.